Aug. 27, 1929.    W. F. GRUPE    1,726,223
CORK SEPARATOR FOR STORAGE BATTERIES
Filed Nov. 12, 1924
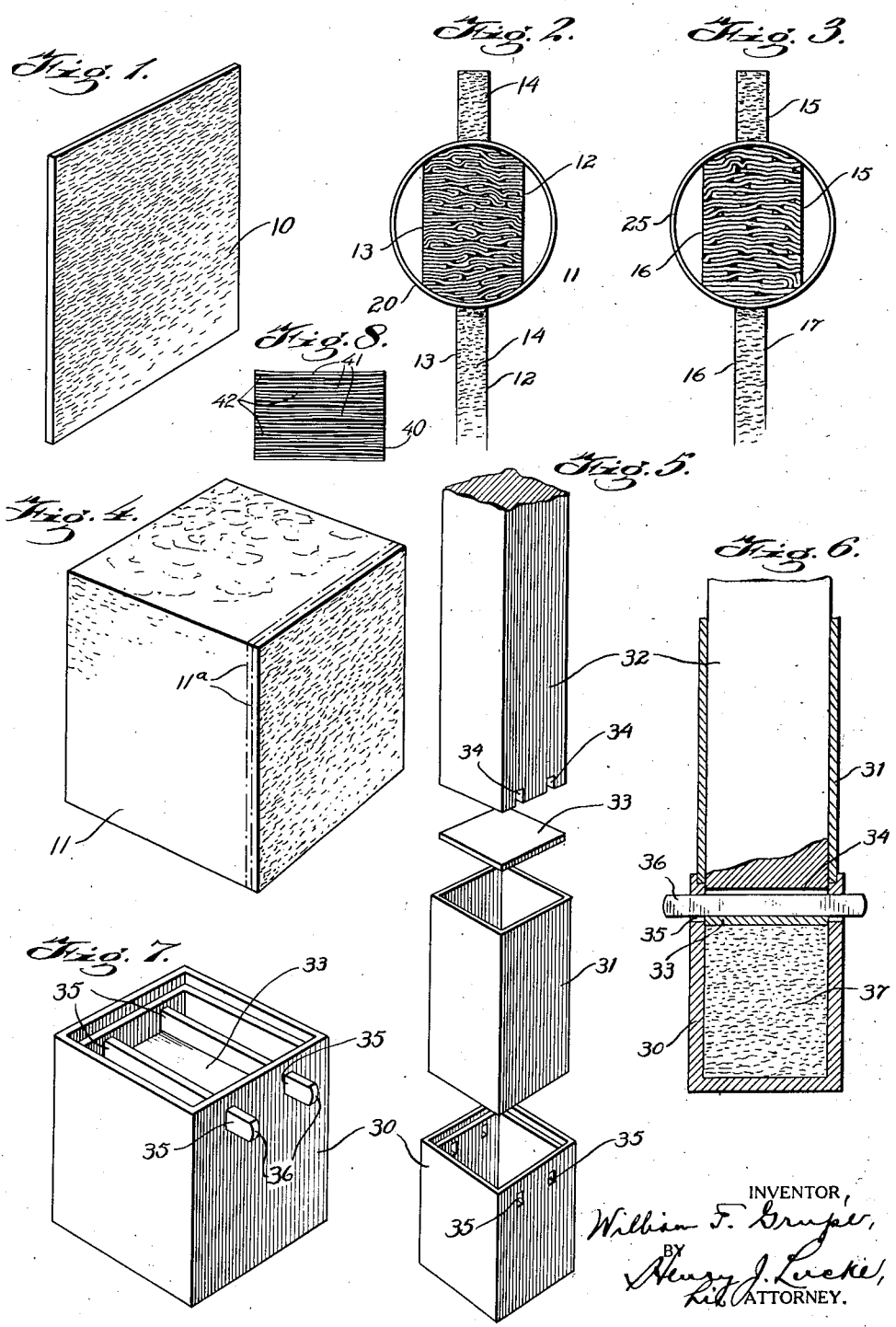
INVENTOR,
William F. Grupe,
BY
Henry J. Luecke,
ATTORNEY.

Patented Aug. 27, 1929.

1,726,223

UNITED STATES PATENT OFFICE.

WILLIAM F. GRUPE, OF LYNDHURST, NEW JERSEY, ASSIGNOR TO BOUCHER CORK COMPANY, OF NEW YORK, N. Y., A CORPORATION OF NEW YORK.

CORK SEPARATOR FOR STORAGE BATTERIES.

Application filed November 12, 1924. Serial No. 749,396.

This invention relates to improved separators for storage batteries and electrolytic cells generally and the method of forming the same.

Pursuant to the invention, the separator is formed of cork or other resinous woods and like material from flakes or like flat particles treated to be formed into a mass. Preferably, the particles are interbonded to one another at spaced locations and in overlapping relation to provide bonded areas and consequent cork masses impervious to the electrolyte and intermediate nonbonded areas and intervening air spaces, whereby the mass of the separator is pervious to the electrolyte, thus obviating the necessity of perforations or other openings as is required in separators of other types.

Pursuant to a preferred method of forming the separator, the flakes or other flat particles of cork, pine wood, California redwood and the like are fed into a mold and subjected to pressure and baking to distill the resins of the particles to effect the desired interbonding of the particles to form masses which are impervious to the electrolyte and intervening air spaces which latter afford passages for the electrolyte. It is advantageous to utilize a mold having a cross-sectional area corresponding to the cross-sectional area of the flat face of the desired separator and to position such mold to locate such cross-sectional area substantially vertically; the particles are fed under gravity into the mold to thereby position the particles substantially horizontally. The resulting baked mass is then sawed or otherwise severed along planes for the desired separators, whereby the opposite flat faces of the separator extend substantially perpendicularly to the positions of the constituent flat particles.

Further features and objects of the invention will be more fully understood from the following detail description and the accompanying drawings, in which—

Fig. 1 is a perspective view of a separator embodying my invention;

Fig. 2 is a sectional elevation of a separator formed of relatively thin particles;

Fig. 3 is a sectional elevation similar to Fig. 2, but representing the separator mass when constituted of relatively thick particles;

Fig. 4 is a perspective view of a molded mass formed in accordance with one of my preferred methods;

Fig. 5 is an exploded perspective view showing a mold provided with a filling and guiding chute and compression ram for carrying out the form of my method; and Fig. 6 is a sectional view showing the mold filled with a charge, the cover plate of the mold clamped on the charge and the ram in raised position; and Fig. 7 is a top perspective view of the filled mold; and Fig. 8 is a magnified view of a modification.

Referring to Fig. 1, the separator 10 may be of any desired dimensions corresponding to the requirements of storage batteries, primary batteries and electrolytic cells generally.

The separator is formed of particles of material such as cork waste, shavings of pine wood or of California redwood or like material inherently containing resinous material of the nature applicable for carrying out my invention; the separator may be formed of flat particles of paper chip or other stock to which resins are added as may be required for attaining the objects of the invention.

As examples of cork material, cork waste of the various varieties, such as cork flakes derived by grinding thin cork shavings, or ground cork tip waste derived in the manufacture of cork tips for cigarettes, may be employed.

In the use of pine wood, California redwood and the like, the wood is cut into shavings, and the shavings ground between circular knives, similarly as in the recognized ground cork waste products.

When the separator is made of paper such as chip or other paper stock, it is formed into sheets and ground.

It is understood that the term "ground" includes all the usual or approved methods of cutting, grinding, chipping or otherwise subdividing the flat materials into particles of less superficial area but having substantially flat faces on opposite sides.

Ground cork flakes result in flat particles of substantially uniform thickness, whereas ground tapered cork waste forms flat particles varying in thickness from that of tissue paper to that of cardboard. Cork disk waste when ground gives rise to relatively thick, flat particles of substantially uniform thickness.

In the use of pine wood, California redwood and like inherently containing resinous woods, the same are cut and ground to the desired flat flakes.

Resins may be added to the charge when it is desired to increase the resultant resinous content of the molded mass.

When paper stock is employed, resins are added to the mold charge and of such character and amount as required to carry out my invention.

The mold preferably is of a configuration having a vertical cross-sectional area corresponding to the cross-sectional area of the desired separators and the mold is positioned to locate the plane of such cross-sectional area of the mold substantially vertical. The mold may be of a box and inwardly closing cover type, that is to say, the box is of rectangular form having an open top and the closure cover a plate fitting within the open top of the box.

The charge may be fed under gravity into the mold and subjected to tamping to build up successive layers of determined thickness and to pack the charged layers progressively as the mold is being filled. Upon complete filling of the mold, the cover plate is positioned under pressure and the mold and its contained charge are subjected to the desired temperature to effect the distribution of the resin and interbonding of the particles.

In the use of cork particles, under a pressure of a range represented by the reduction of volume of the cork particles from 3 to 1 to 6 to 1 and at a temperature upwards of 500° F. the water and more volatile content of the resins contained in the walls of the cells of the cork are distilled through the natural pores of the cork leaving behind the less volatile resin constituent are substantially closed and the cork particles are interbonded to one another at spaced areas of contact with intervening non-bonded areas and intervening air spaces of varying magnitude.

In a similar manner, other resinous wood such as pine wood, California redwood and other materials to which resins are added, are charged into the mold and subjected to the necessary pressure and required temperature for effecting the interbonding of the particles described hereinabove relative to cork particles.

Upon charging the flat particles into the mold as described above, the same are located in the mold in substantially horizontal positions, with the adjacent flat faces in more or less overlapping relation to one another.

The molded mass 11, see Fig. 4, is then severed on vertical planes 11$^a$ at distances corresponding to the desired thickness of the separators. It will be noted that the planes of cutting 11$^a$ represented by the planes of the opposite flat faces 12, 13 of a separator 14, see Fig. 2, are substantially at right angles to the planes of position of the constituent thin, flat particles 18 of the separator 14. This will also be observed from Fig. 3, representing thick, flat particles 19 disposed in planes substantially at a right angle to the planes of the flat faces 15, 16 of the separator 17.

A portion of Fig. 2 has been illustrated as under magnification as by means of a magnifying glass 20 to show on an enlarged scale the relative positions of the particles 18 of varying superficial areas of the separator 14. Fig. 2 represents a separator formed of substantially uniform and relatively thin particles; the magnification illustrates the nature of interbonding of the particles at spaced areas of contact, as at 21, 22, and intermediate non-bonded areas with the formation of an air space, as at 23.

Such relation of the particles to one another obtains from one flat face 12 to the opposite flat face 13 of the separator 14, see Fig. 2, whereby there is present at each of the opposite flat faces 12, 13 an indefinitely large number of clearances afforded by the air spaces which provide passage for the electrolyte through the body of the separator 14 possibly by capillary action in the smaller clearances but not of sufficient extent in the larger openings to permit the passage of any solid materials from one electrode to another electrode. Such air space formation provides a support for the filling material of the grids of the electrodes and prevents the same from dropping out and short-circuiting the cell.

The cork particles which are bonded to one another, form the cork masses which are spaced from one another by the intervening air spaces and are bonded together to form as a whole a unitary body which is capable of withstanding the pressure and is immune to and chemically inert to the chemical actions and temperature variations incident to the charging and discharging of the battery. Such action ensues by reason of the cork material of the composite particles and is enhanced by the resin natural in cork or added thereto which coats the exposed surfaces of the cork particles. By my invention, substantially all of the natural pores of the cork particles are eliminated, by the heat and pressure treatment or filled by the exuded or added resin.

In a similar manner, a portion of the separator 17, see Fig. 3, is shown enlarged under a microscope 25 to illustrate the substantially horizontal positions of the relatively thick and flat particles 19 interbonded to one another, see 26, 27, and having intervening non-bonded areas and air spaces, see 28.

The mold may be of the form illustrated in Figs. 5, 6 and 7, namely the rectangular or box portion 30 of the mold provided with a removable chute 31 serving a guide for filling the mold with the charge. The ram 32 is applied to the charge to compress the charge from the volume represented by the summation of the mold and the filling chute 31 to the volume assumed by the charge when the cover plate 33 is applied. The volume or cubical content of the chute 31 is selected in accordance with the desired reduction of volume, thereby yielding the desired compression of the charge when subjected to the baking temperature.

The head of the ram 32 is preferably provided with slots 34, 34 and the sides of the mold 30 with corresponding openings 35, 35 to receive bars 36, 36 for locking the cover plate 33 and the charge 37 under compression of the ram 32 when the ram 32 and cover plate 33 are in lower position, indicated in Fig. 6.

The same mold 30 may be employed with different heights of filling and guiding chutes 31 corresponding to the desired reduction of volume and consequent degree of compression of the charge 37.

The thickness of the separator is selected to yield a body or mass resistance of each separator sufficient to substantially offset the pressure of the electrodes relative to one another in the event of buckling or other distortion of the electrodes incident in the use of storage batteries, primary batteries or other cells.

The separator may be formed by laying in the mold sheets of commercial natural corkwood, one upon the other until the mold is filled and the cover applied under the desired pressure, each sheet being of approximately the horizontal cross-section of the mold and subjecting the thus compressed, superimposed cork sheets to the desired temperature. Commercial cork sheets are employed as stock for tips on cigarettes and are of a thickness of approximately one sixty-fourth of an inch and are severed from blocks of natural corkwood of fair quality substantially parallel to the rings of annual growth, giving rise to numerous spaced holes passing through the sheet. The resulting baked molded mass is severed on planes transverse to the direction of extension of the respective individual sheets, similarly as indicated in Fig. 4. The mass of each derived separator 40, see Fig. 8, has the characteristics of being formed of laminations of cork sheets "spot welded" or bonded to one another by the exuded natural resin at spaced locations 41 with intermediate non-bonded areas and clearances 42 of varying extents. Such clearances 42 communicate more or less with one another either directly or through the natural pores of such cork sheets, thus affording innumerable passages for the electrolyte through each separator of the nature of capillary openings. Such form of my separator offers a greatly reduced resistance to the electrical current between the respective electrodes.

In the use of my invention, the separator need not be perforated through the body of the separator and slotted on one face as in heretofore proposed separators, as the clearances between the particles communicate to more or less extent with one another, and provide passages for the electrolyte at an effectually reduced electrical resistance. The separator, in addition to the air spaces, may be perforated when desired, similar to separators formed of other materials.

The resinous coating about the particles protects the body of the particles from chemical attack by the electrolyte or the chemicals added to or formed in the use of the battery or electrolyte cell.

I have discovered that the immersion of the particles on the electrolyte and the more or less flexing of the particles arising by reason of electrolysis of the solution of the battery or cell and the consequent heating, tend to maintain the life of the particles and accordingly the life of the separator as a whole.

Separators embodying my invention possess a high dielectric coefficient and preclude the leakage of electric current between the electrodes exteriorally of the electrolyte. The mass of a separator formed of particles interbonded to one another pursuant to my invention is free from any tendency to warp under atmospheric conditions and when immersed in the electrolyte of a storage battery, primary battery or other electrolytic cell. Separators embodying my invention do not require immersion in water or other bath to maintain normal condition as is required with wood separators of heretofore proposed types when being shipped from the location of manufacture of the separators to the location of assembly in a battery or cell. The mass of a separator formed in accordance with my invention possesses sufficient strength to prevent splitting or breaking when handled in the stages of manufacture, shipment and assembly and is puncture proof against pressure arising in and incidental to electrolysis in storage batteries, primary batteries provided with separators made in accordance with my invention effect rapid release of the gases formed at the electrodes in the charging and discharging of the storage battery, thus enabling the recharging of the storage battery at higher amperage.

Under certain circumstances, and particularly when it is desirable not to elevate the treated cork particles to a temperature required for vaporizing the constituents of the natural resins inherent in cork or of the resins added to the charge, the bonding of the cork particles may be attained by the use of rubber added to the charge in solution in a solvent which is substantially vaporized at the baking temperature of approximately 275° F., the range of which temperature is varied in accordance with the particular binding material employed. In lieu of the use of rubber or rubber compositions, latex or a synthetic rubber, or the ingredients for forming the same, or sulfurated castor oil or the like substantially immune to the particular electrolyte may be added to the charge to serve as the bonding medium.

Whereas I have described my invention by reference to specific forms thereof it will be understood that many changes and modifications may be made without departing from the spirit of the invention.

I claim:

1. The method of forming a separator of cork material for electrical batteries which comprises charging flat cork particles in a mold to locate the cork particles with their flat faces substantially parallel, compressing the same therein to a desired uniform pressure, subjecting the compressed cork particles while in the mold to a temperature to effect a distribution of resinous material at spaced locations over the surfaces of the cork particles and severing the molded product along planes disposed at an angle to the planes of the surfaces of the cork particles.

2. The method of forming a separator of cork material for electrical batteries which comprises charging flat cork particles in a mold to locate the cork particles with their flat faces substantially parallel by successive stages of compression, compressing the same therein to a desired uniform pressure, subjecting the compressed cork particles while in the mold to a temperature to effect a distribution of resinous material at spaced locations over the surfaces of the cork particles and severing the molded product along planes disposed at an angle to the planes of the surfaces of the cork particles.

3. The method of forming a separator of cork material for electrical batteries which comprises charging flat cork particles in a mold to locate the cork particles with their flat faces substantially parallel, compressing the same therein to a desired uniform pressure, subjecting the compressed cork particles while in the mold to a temperature to effect a distribution of the resinous material inherent in cork at spaced locations over the surfaces of the cork particles and severing the molded product along planes disposed at an angle to the planes of the surfaces of the cork particles.

4. The method of forming a separator of cork material for electrical batteries which comprises charging flat cork particles in a mold to locate the cork particles with their flat faces substantially parallel by successive stages of compression, compressing the same therein to a desired uniform pressure, subjecting the compressed cork particles while in the mold to a temperature to effect a distribution of the resinous material inherent in cork at spaced locations over the surfaces of the cork particles and severing the molded product along planes disposed at an angle to the planes of the surfaces of the cork particles.

5. A separator for elements of electrolytic cells, in the form of a relatively thin, flat sheet, and composed of originally-flat fragments of dielectric material resistant to electrolyte, the fragments being arranged in flatwise overlapping relation and substantially edgewise to the broad faces of the sheet and secured together by spaced bonds of material substantially immune to electrolyte, the sheet as a whole being pervious to liquid by passages afforded between adjacent faces of the fragments and their bonds.

6. A separator for elements of electrolytic cells, in the form of a relatively thin, flat sheet, and composed of originally flat fragments of cork, the fragments being arranged in flatwise overlapping relation and substantially edgewise to the broad faces of the sheet and secured together by spaced bonds of resinous material originally inherent in the cork, the sheets as a whole being pervious to liquid by passages afforded between adjacent faces of the fragments and their bonds.

In testimony whereof I have signed this specification this 31st day of October, 1924.

WILLIAM F. GRUPE.